United States Patent
Fukuda

(10) Patent No.: US 7,493,022 B2
(45) Date of Patent: Feb. 17, 2009

(54) VIDEO SIGNAL PROCESSING APPARATUS AND METHOD

(75) Inventor: Hiroshi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 11/204,044

(22) Filed: Aug. 16, 2005

(65) Prior Publication Data

US 2006/0038898 A1   Feb. 23, 2006

(30) Foreign Application Priority Data

Aug. 18, 2004  (JP) ............................ P2004-238349

(51) Int. Cl.
    *H04N 5/91* (2006.01)
(52) U.S. Cl. ....................................... 386/83
(58) Field of Classification Search ................... 386/46, 386/83, 95, 112
    See application file for complete search history.

(56) References Cited

U.S. PATENT DOCUMENTS

| 7,158,714 B2 * | 1/2007 | Moteki et al. ............... 386/112 |
| 7,224,886 B2 * | 5/2007 | Akamatsu et al. ............. 386/83 |
| 7,254,318 B2 * | 8/2007 | Imada et al. ................. 386/112 |
| 2001/0006400 A1 | 7/2001 | Kubo et al. |
| 2002/0008764 A1 | 1/2002 | Nakayama |
| 2002/0186961 A1 * | 12/2002 | Kikuchi et al. ................ 386/98 |
| 2004/0126083 A1 | 7/2004 | Katano et al. |
| 2004/0223727 A1 * | 11/2004 | Ohnishi ....................... 386/46 |

FOREIGN PATENT DOCUMENTS

JP  2001-036849  2/2001

* cited by examiner

*Primary Examiner*—Thai Tran
*Assistant Examiner*—Mishawn Dunn
(74) *Attorney, Agent, or Firm*—Finnegan, Henderson, Farabow, Garrett & Dunner, L.L.P.

(57) ABSTRACT

In a first mode, a video signal processing apparatus records a video signal subjected to a first image processing by a first image processing unit on a first recording medium through the first recording unit. In a second mode, the video signal processing apparatus records a video signal subjected to a second image processing by a second image processing unit on a second recording medium through the second recording unit. In a case where a residual quantity of the second recording medium is smaller than a set value, the video signal processing apparatus records the video signal subjected to the second image processing by the second image processing unit on the first recording medium through the first recording unit.

10 Claims, 4 Drawing Sheets

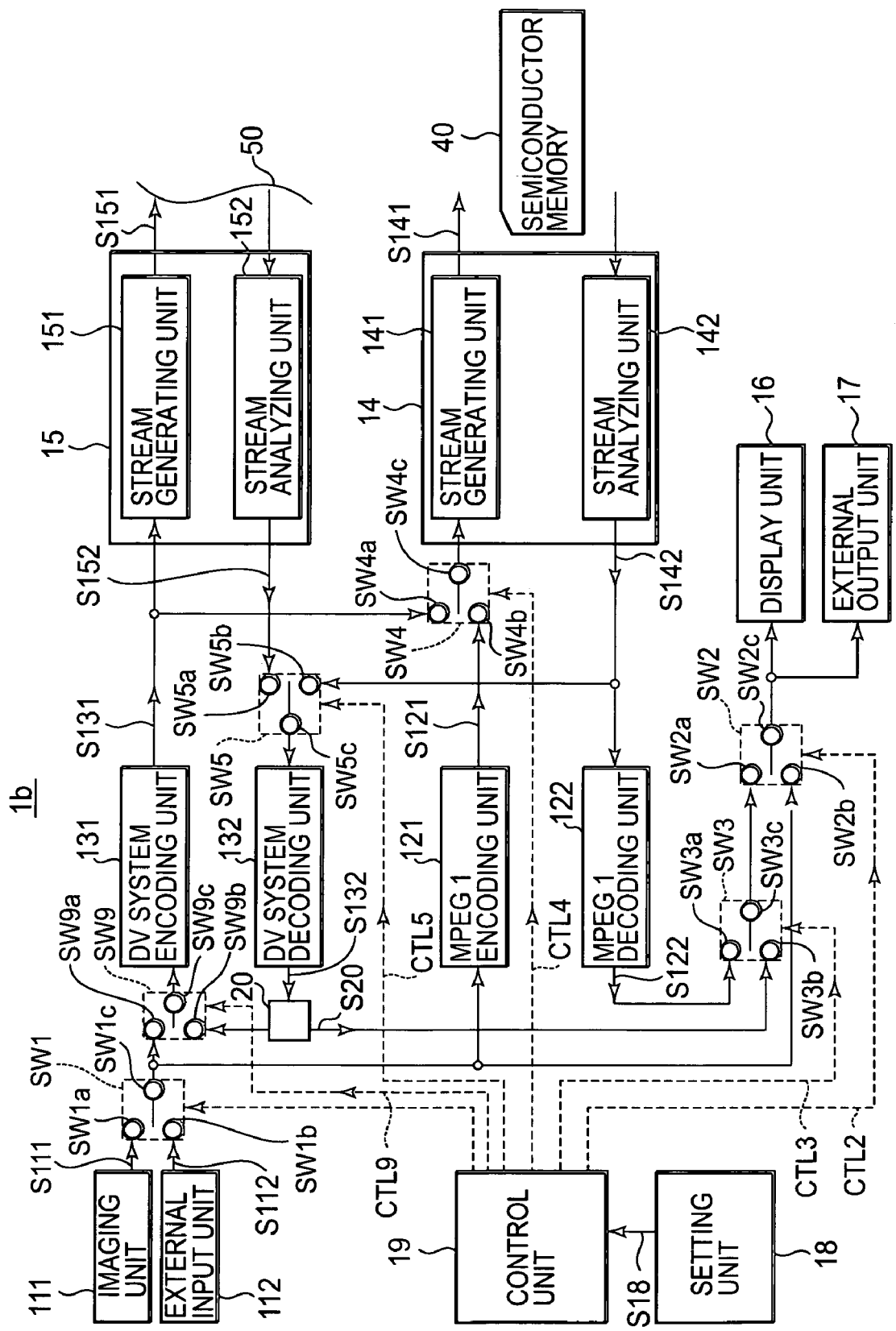

VIDEO SIGNAL PROCESSING APPARATUS AND METHOD

BACKGROUND OF THE INVENTION

1. Field of the Invention

The present invention relates to a video signal processing apparatus and method performing processing of recording a video signal inputted from, for example, an imaging unit, an external apparatus or the like, on a recording medium.

2. Description of Related Art

For example, a camera-integrated type video tape recorder (VTR), in which video data captured by a camera unit is recorded in a recording medium such as a magnetic tape is known (see, for example, Published Japanese Patent Application (KOKAI) No. 2001-36849).

Now, for example, an apparatus recording a video signal on a recording medium capable of being linearly accessed such as a magnetic tape by a defined recording system, such as a digital video (DV) system, or an apparatus recording a video signal on a recording medium capable of being randomly accessed, such as a flash memory, by another defined recording system, for example, a recording system such as the Motion Picture Experts Group (MPEG) 1 of a lower data rate than that of the DV system is also known.

Generally, a recording medium capable of being randomly accessed at a high speed such as a flash memory is more expensive and having a smaller storage capacity in comparison with a magnetic tape capable of being accessed linearly. Accordingly, a video signal of a high image quality is mainly recorded on a recording medium such as a magnetic tape in conformity with the digital video (DV) system, and a video signal of lower image quality is supplementary recorded on a recording medium such as a flash memory in conformity with the MPEG 1 recording system of a low data rate. However, the video signal recorded at a low data rate in the way described above has a low image quality, and an improvement is desired.

SUMMARY OF THE INVENTION

The present invention was made in view of such a situation. The present invention provides a video signal processing apparatus including a first mode for recording a video signal on a first recording medium capable of being randomly accessed, and a second mode for recording the video signal on a second recording medium capable of being randomly accessed at a lower speed than that of the first recording medium or capable of being linearly accessed. Even in a case where a residual recordable quantity of the second recording medium is small in the second mode, the video signal processing apparatus is capable of recording the video signal without performing a troublesome operation so as not to degrade an image quality.

For acquiring the video processing apparatus as mentioned above, a video signal processing apparatus according to an embodiment of the present invention includes a first image processing means for performing first image processing to a video signal; second image processing means for performing second image processing to the video signal, and for generating a signal of a data rate larger than that of the video signal subjected to the first image processing; first recording means for recording the video signal subjected to the image processing on a first recording medium capable of being randomly accessed; second recording means for recording the video signal subjected to the image processing on a second recording medium capable of being linearly accessed or of being randomly accessed at a speed lower than that of the first recording medium; and control means for recording the video signal subjected to the first image processing by the first image processing means on the first recording medium through the first recording means in a first mode, for recording the video signal subjected to the second image processing by the second image processing means on the second recording medium through the second recording means in a second mode, and for recording the video signal subjected to the second image processing by the second image processing means on the first recording medium through the first recording means in a case where a residual quantity of the second recording medium is smaller than a set value.

According to the video signal processing apparatus of the embodiment of the present invention, in the first mode, the control means records the video signal subjected to the first image processing by the first image processing means on the first recording medium through the first recording means, and, in the second mode, records the video signal subjected to the second image processing by the second image processing means on the second recording medium through the second recording means, and further records the video signal subjected to the second image processing by the second image processing means on the first recording medium through the first recording means in a case where the residual quantity of the second recording medium is smaller than the set value.

Furthermore, a video signal processing apparatus according to another embodiment of the present invention includes first recording means capable recording a video signal on a first exchangeable recording medium, second recording means capable of recording the video signal on a second exchangeable recording medium by a recording system different from a recording system of the first recording means, and control means for recording the video signal on the first recording medium using the second recording means in a case where a residual recording quantity of the second recording medium is smaller than a set value, for reading the recorded video signal from the first recording medium using the second recording means in response to a transfer instruction, and for recording the read video signal on the second recording medium with the second recording means.

According to the present invention, it is possible to provide a video signal processing apparatus including the first mode for recording a video signal on the first recording medium capable of being randomly accessed, and the second mode for recording the video signal on the second recording medium capable of being randomly accessed at a speed lower than that of the first recording medium or of being linearly accessed. The video signal processing apparatus is capable of recording the video signal without performing troublesome operations so as not to degrade image quality even in a case where the residual quantity of the second recording medium is small in the second mode.

BRIEF DESCRIPTION OF THE DRAWINGS

FIG. 4 is a functional block diagram of a video recorder to which a video signal processing apparatus according to a third embodiment of the present invention is applied.

DETAILED DESCRIPTION OF THE PREFERRED EMBODIMENTS

First Embodiment

A camera-integrated type video recorder (hereinafter also simply referred to as a "video recorder") to which a video signal processing apparatus according to a first embodiment of the present invention is applied is described.

Figure 1:
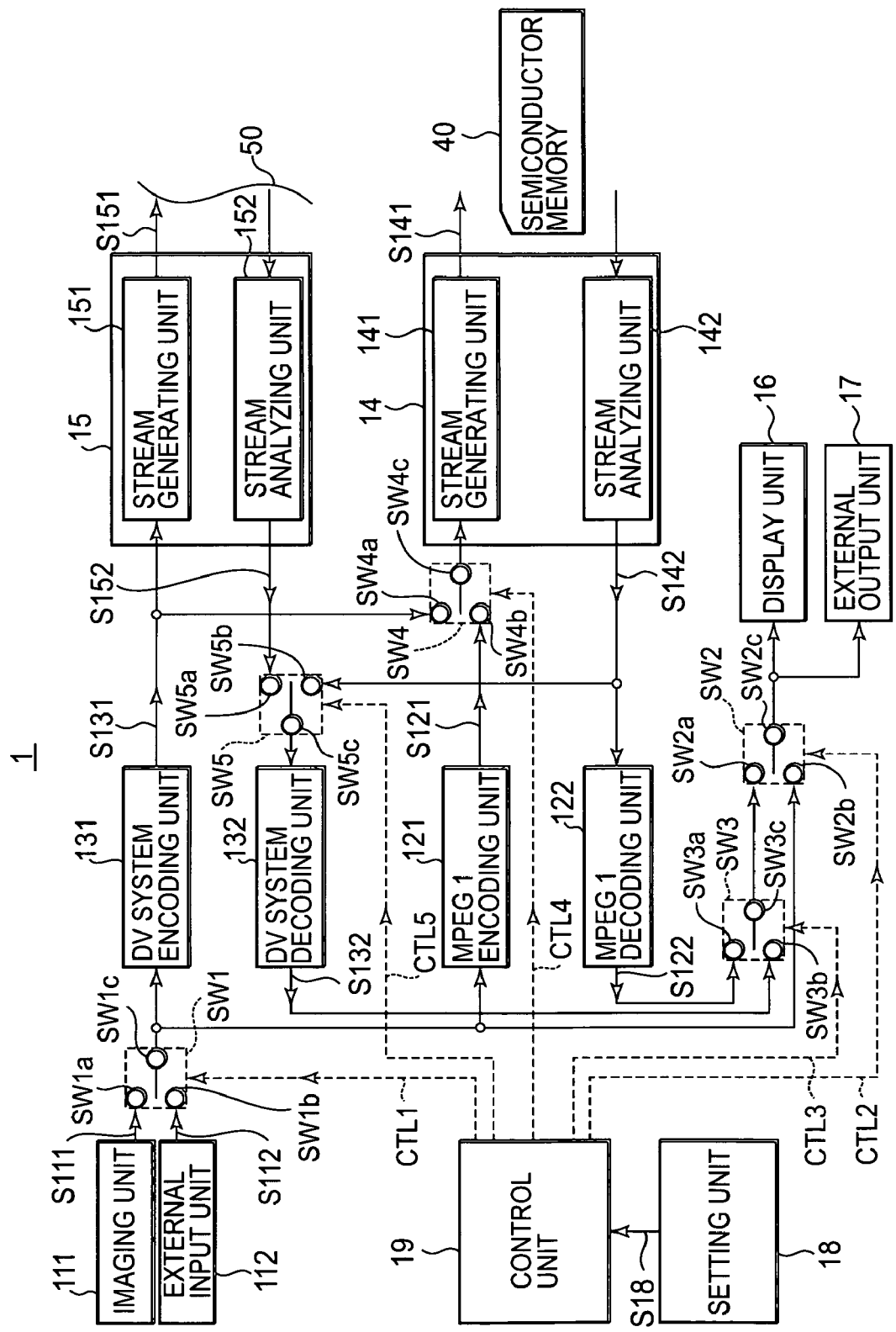
FIG. 1 is a functional block diagram of a video recorder to which a video signal processing apparatus according to a first embodiment of the present invention is applied.

Hereinafter, the video recorder is described in detail with reference to the attached drawings. FIG. 1 is a functional block diagram of a video recorder to which the video signal processing apparatus according to the first embodiment of the present invention is applied.

A video recorder 1 according to the present embodiment includes, for example, as shown in FIG. 1, an imaging unit 111, an external input unit 112, an MPEG 1 encoding unit 121, an MPEG 1 decoding unit 122, a DV system encoding unit 131, a DV system decoding unit 132, a first recording and reproducing unit 14, a second recording and reproducing unit 15, a display unit 16, an external output unit 17, a setting unit 18, a control unit 19 and selectors SW1-SW5.

The control unit 19 is equivalent to an example of control means of the present invention. The MPEG 1 encoding unit 121 is equivalent to an example of first image processing means and first encoding means. The DV system encoding unit 131 is equivalent to an example of second image processing means and second encoding means according to the present invention. The DV system decoding unit 132 is equivalent to an example of decoding means according to the present invention.

The first recording and reproducing unit 14 is equivalent to an example of first recording means according to the present invention, and the second recording and reproducing unit 15 is equivalent to an example of second recording means according to the present invention.

The imaging unit 111 generates a video signal on the basis of a result of having imaged a not shown subject, for example, and outputs the generated video signal as a video signal S111. The imaging unit 111 is composed of an imaging device such as a charge coupled device (CCD) and a complementary metal oxide semiconductor (CMOS), an analog to digital conversion (AD) circuit performing an analog to digital (AD) conversion processing to a signal outputted from the imaging device, a processing circuit performing gamma correction processing and automatic gain control (AGC) processing, and the like.

The external input unit 112 inputs a video signal from, for example, an external apparatus, and performs signal processing to the inputted video signal to output the processed video signal as a signal S112. For example, the external input unit 112 is composed of an external input terminal and the like.

The video recorder 1 includes the first image processing means performing the first image processing to a video signal, and the second image processing means performing the second image processing to the video signal to generate a signal having a larger data rate than that of the video signal subjected to the first image processing by the first image processing means. The first image processing means includes first encoding means performing first encoding processing to the video signal, and the second image processing means includes second encoding means performing second encoding processing to the video signal to generate encoded data having a data rate larger than that of the encoded data generated by the first encoding processing.

In specific, the video recorder 1 of the present embodiment includes, for example, the MPEG 1 encoding unit 121 as the first encoding means, and the DV system encoding unit 131 as the second encoding means.

The MPEG 1 encoding unit 121 performs previously defined encoding processing, in detail, MPEG 1 encoding processing, to the video signal S111 to output it as a signal S121. The MPEG 1 decoding unit 122 performs, for example, the inverse conversion processing of the encoding processing of the MPEG 1 encoding unit 121, in detail, the MPEG 1 decoding processing of an inputted signal, to output the decoded signal as a signal S122.

The DV system encoding unit 131 performs defined encoding processing, in detail, digital video (DV) system encoding processing, to the video signal S111, and outputs the encoded video signal S111 as a signal S131.

The DV system decoding unit 132 performs, for example, the inverse conversion processing of the encoding processing of the DV system encoding unit 131, in detail, the DV system decoding processing of an inputted signal, to output the decoded signal as a signal S132.

As described above, the encoded data (S131) generated in conformity with the DV system encoding processing has a data rate larger than the encoded data (S121) generated in conformity with the MPEG 1 encoding processing. That is, in the present embodiment, although a data quantity becomes smaller due to the high-compression processing in the MPEG 1 encoding processing in comparison with the DV system encoding processing, the image quality thereof deteriorates.

The first recording and reproducing unit 14 records a video signal subjected to image processing, in detail, encoding processing, on a recording medium 40, and reads the signal recorded on the recording medium 40. The recording medium 40 is equivalent to an example of the first recording medium according to the present invention. The recording medium 40 is, for example, a recording medium capable of being randomly accessed at a higher speed in comparison with a recording medium 50, which will be described later. Moreover, the recording medium 40 is a recording medium detachably attachable to an apparatus and exchangeable. In the present embodiment, the recording medium 40 is, for example, a semiconductor memory.

The first recording and reproducing unit 14 includes, for example, as shown in FIG. 1, a semiconductor memory recording stream generating unit (hereinafter also simply referred to as a "stream generating unit") 141 and a semiconductor memory reproducing stream analyzing unit (hereinafter also simply referred to as a "stream analyzing unit") 142.

The stream generating unit 141 generates a data stream of a video signal subjected to image processing, in detail, encoding processing, in conformity with a previously defined recording system to record the generated data stream on the recording medium 40 as a signal S141. The stream analyzing unit 142 reads the data stream of a video signal, in detail, encoded data, recorded in the recording medium 40, and analyzes the read data stream in conformity with the defined recording system to output the analyzed data stream as a signal S142.

The second recording and reproducing unit 15 records a video signal subjected to image processing on the recording medium 50, and reads the signal recorded on the recording medium 50. The recording medium 50 is equivalent to an example of the second recording medium according to the present invention. The recording medium 50 is a recording medium capable of being linearly accessed or being randomly accessed at a lower speed than that of the recording medium 40. Moreover, the recording medium 50 is a recording medium detachably attachable to an apparatus and exchangeable. For example, the recording medium 50 is a recording medium such as a magnetic tape and a disk (such as a DVD, an optical disc and a magneto-optical disc). In the present embodiment, the recording medium 50 is a magnetic tape.

The second recording and reproducing unit 15 includes a tape recording stream generating unit (hereinafter also simply referred to as a "stream generating unit") 151 and a tape reproducing stream analyzing unit (hereinafter also simply referred to as a "stream analyzing unit") 152. The stream generating unit 151 generates a data stream of a video signal subjected to image processing, in detail, encoding processing, in conformity with a previously defined recording system to record the generated data stream on the recording medium 50 as a signal S151. The stream analyzing unit 152 reads the video signal recorded on the recording medium 50, specifically the data stream of the encoded data, and analyzes the read data stream in conformity with the defined recording system to output the analyzed data stream as a signal S152.

The display unit 16 displays images according to a video signal in accordance with the control of the control unit 19. The display unit 16 is composed of, for example, a liquid crystal (LCD) monitoring apparatus and a display apparatus such as an organic electroluminescence (EL) apparatus.

The external output unit 17 outputs a video signal to an external video apparatus. For example, the external output unit 17 is composed of a previously defined external output terminal or the like. The setting unit 18 outputs, for example, a signal S18 according to the settings of various modes and set information to the control unit 19. For example, the setting unit 18 is composed of an operation input apparatus such as a keyboard, operation buttons, an operation switch and a touch panel.

The control unit 19 controls each component of the apparatus thoroughly. For example, the control unit 19 sets various modes on the basis of the signal S18 from the setting unit 18, and performs the processing according to the mode.

The selectors SW1-SW5 set intervals between each component to be in a conduction state or a non-conduction state in accordance with the control of the control unit 19.

The selector SW1 has terminals SW1a-SW1c; the selector SW2 has terminals SW2a-SW2c; the selector SW3 has terminals SW3a-SW3c; the selector SW4 has terminals SW4a-SW4c; and the selector SW5 has terminals SW5a-SW5c.

The terminal SW1a is connected to the imaging unit 111; the terminal SW1b is connected to the external input unit 112; and the terminal SW1c is connected to the MPEG 1 encoding unit 121, the DV system encoding unit 131, and the terminal SW2b of the selector SW2.

The terminal SW2c is connected to the display unit 16 and the external output unit 17, and the terminal SW2a is connected to the terminal SW3c of the selector SW3. The terminal SW3a is connected to the MPEG 1 decoding unit 122, and the terminal SW3b is connected to the DV system decoding unit 132.

The terminal SW4a is connected to the DV system encoding unit 131 and the stream generating unit 151, and the terminal SW4b is connected to the MPEG 1 encoding unit 121. The terminal SW4c is connected to the stream generating unit 141. The terminal SW5a is connected to the stream analyzing unit 152, and the terminal SW5b is connected to the stream analyzing unit 142 and the MPEG 1 decoding unit 122.

The selectors SW1-SW5 set the interval between each terminal to be in a conduction state or a non-conduction state on the basis of the control signals CTL1-CTL5 from the control unit 19.

Figure 2:
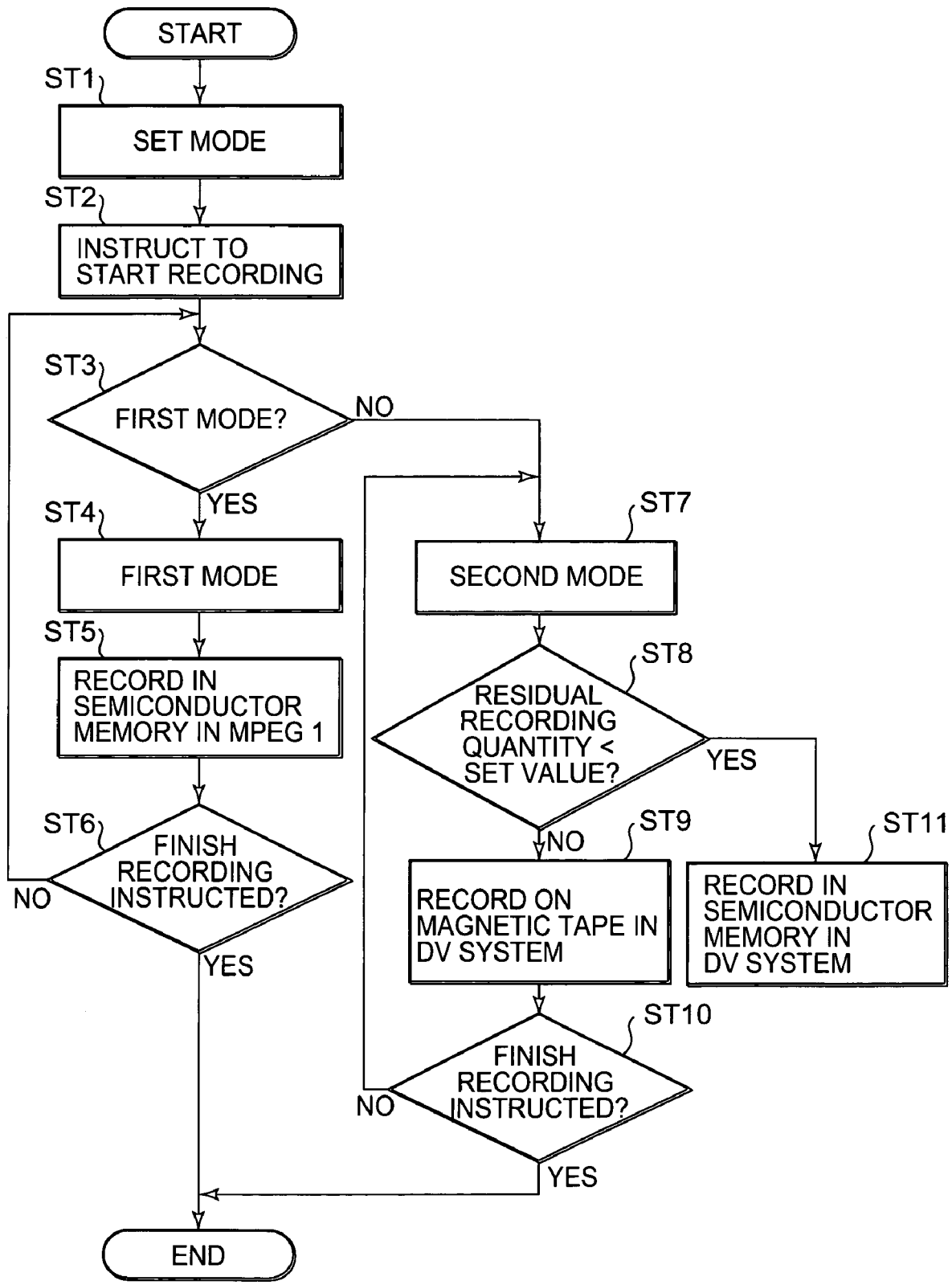
FIG. 2 is a flowchart for illustrating one concrete example of the operation of the video recorder shown in FIG. 1.

FIG. 2 is a flowchart for illustrating a concrete example of the operation of the video recorder shown in FIG. 1. The operation of the video recorder 1 having the configuration described above is described focusing on the operation of the control unit 19 with reference to FIG. 2.

[Image Display Mode]

When the signal S18 instructing setting of an image display mode is inputted into the control unit 19 from the setting unit 18, the control unit 19 outputs the control signals CTL1 and CTL2 to the selectors SW1 and SW2, respectively, and sets the terminals SW1a and SW1c of the selector SW1 to be in the conduction state. Then, the control unit 19 sets the terminals SW2b and SW2c of the selector SW2 to be in the conduction state. The video signal S111 outputted from the imaging unit 111 is outputted to the display unit 16 and the external output unit 17 through the terminals SW1a, SW1c SW2b and SW2c.

[External Input Display Mode]

Upon receiving the signal S18 instructing setting of an external input display mode from the setting unit 18, the control unit 19 outputs the control signals CTL1 and CTL2 to the selectors SW1 and SW2, respectively. Then, the control unit 19 sets the terminals SW1b and SW1c of the selector SW1 to be in the conduction state, and sets the terminals SW2b and SW2c of the selector SW2 to be in the conduction state. The video signal S112 outputted from the external input unit 112 is outputted to the display unit 16 and the external output unit 17 through the terminals SW1b, SW1c, SW2b and SW2c.

[First Mode (Semiconductor Memory Selection Mode)]

The control unit 19 records a video signal subjected to the first encoding processing by the MPEG 1 encoding unit 121 on the recording medium 40 through the first recording and reproducing unit 14 in the first mode.

In detail, for example, when the signals S18 instructing setting of the first mode and indicating the recording instruction are inputted into the control unit 19 from the setting unit 18 (ST1 and ST2), the control unit 19 outputs, for example, the control signal CTL4 to the selector SW4, and sets the terminals SW4b and SW4c of the selector SW4 to be in the conduction state. The MPEG 1 encoding unit 121 performs, for example, MPEG 1 encoding processing to the video signal S111 outputted from the imaging unit 111, and outputs the processed video signal S111 as the signal S121. The signal S121 is inputted into the stream generating unit 141 through terminals SW4b and SW4c. The stream generating unit 141 records as the video signal S141, the signal S121 on the recording medium 40 capable of being randomly accessed by the defined recording system. In this case, the stream generating unit 141 records a signal indicating the encoding system of the MPEG 1 encoding unit 121 on the recording medium 40 in association with the video signal S141 (ST4 and ST5). When the signal S18 indicating, for example, a recording termination instruction is inputted into the control unit 19 from the setting unit 18, the control unit 19 terminates the recording of the video signal onto the recording medium 40 (ST6).

[Second Mode (Magnetic Tape Selection Mode)]

The control unit 19 records a video signal subjected to the DV system encoding processing by the DV system encoding unit 131 on the recording medium 50 through the second recording and reproducing unit 15 in the second mode. In a case where the residual quantity of the recording medium 50 is smaller than the set value, the control unit 19 records the video signal subjected to the DV system encoding processing by the DV system encoding unit 131 on the recording medium 40 through the first recording and reproducing unit 14.

In detail, for example, when the signals S18 instructing the setting of the second mode and indicating the recording instruction are inputted into the control unit 19 from the setting unit 18 (ST1-ST3, ST7), the control unit 19 discriminates whether the residual recording quantity of the recording medium 50 is smaller than the set value or not (ST8). In a case where the residual recording quantity of the recording medium 50 is more than the set value or equal to, for example, in a case where the residual recording quantity is more than about several tens seconds or equal, the control unit 19 makes the stream generating unit 151 record the signal S131 subjected to the DV system encoding processing by the DV system encoding unit 131 on the recording medium 50 (ST9). For example, when the signal S18 indicating a recording termination instruction is inputted into the control unit 19 from the setting unit 18, the control unit 19 terminates the recording of the video signal onto the recording medium 50 (ST10).

On the other hand, in a case where the control unit 19 discriminates that the residual recording quantity of the recording medium 50 is smaller than the set value at the discrimination at Step ST8, the control unit 19 outputs the control signal CTL4 to set the terminals SW4a and SW4c to the conduction state. Then, the control unit 19 makes the stream generating unit 141 record the signal S131 subjected to the DV system encoding processing by the DV system encoding unit 131 on the recording medium 40 through the terminals SW4a and SW4c (ST11). In this case, the control unit 19 makes the stream generating unit 141 generate a signal indicating the encoding system of the DV system encoding unit 131 to record the generated signal on the recording medium 40 in association with the video signal S131. Then, for example, when the signal S18 indicating the recording termination instruction is inputted into the control unit 19 from the setting unit 18, the control unit 19 terminates the recording of the video signal on the recording medium 40 (ST10).

[First Recording Medium (Semiconductor Memory) Reproducing Mode]

When the signal S18 instructing the setting of a first recording medium reproducing mode is inputted into the control unit 19 from the setting unit 18, the control unit 19 outputs the control signals CTL3 and CTL2 to set the terminals SW3a and SW3c to the conduction state, and to set the terminals SW2a and SW2c to the conduction state, respectively.

The control unit 19 makes the first recording and reproducing unit 14 read a signal recorded on the recording medium 40, and the stream analyzing unit 142 analyzes the read stream data in conformity with the defined recording system.

In this case, the control unit 19 outputs the signal S142 to the MPEG 1 decoding unit 122 or the DV system decoding unit 132 on the basis of the data indicating the decoding system associated with the video signal recorded on the recording medium 40, which video signal has been analyzed by the stream analyzing unit 142. For example, when the data indicating the first encoding processing (for example, MPEG 1 system) is associated with the video signal, the control unit 19 outputs the signal S142 to the MPEG 1 decoding unit 122. The MPEG 1 decoding unit 122 performs decoding processing to the signal S142 in conformity with the defined decoding system, for example, the MPEG 1 decoding system, and outputs the decoded signal to the display unit 16 and the external output unit 17 as the signal S122 through the terminals SW3a, SW3c, SW2a and SW2c.

On the other hand, for example, in a case where the data indicating the second encoding processing (for example, DV system) is associated with the video signal, the control unit 19 outputs the control signals CTL5 and CTL3. Then, the control unit 19 connects terminals SW5b and SW5c in the conduction state, and sets the terminals SW3b and SW3c in the conduction state. The DV system decoding unit 132 performs decoding-processing to the signal S142 inputted through the terminals SW5b and SW5c in conformity with the defined decoding system, for example, the DV system, and outputs the decoded signal to the display unit 16 and the external output unit 17 through the terminals SW3b, SW3c, SW2a and SW2c as the signal S132.

[Second Recording Medium (Magnetic Tape) Reproducing Mode]

For example, upon receiving the signal S18 instructing setting of the second recording medium reproducing mode from the setting unit 18, the control unit 19 outputs the control signals CTL5, CTL3 and CTL 2. Then, the control unit 19 sets the terminals SW5a and SW5c in the conduction state, and sets the terminals SW3b and SW3c in the conduction state. Moreover, the control unit 19 sets the terminals SW2a and SW2c in the conduction state.

The control unit 19 makes the second recording and reproducing unit 15 read a signal recorded on the recording medium 50, and the stream analyzing unit 152 analyzes the read stream data in conformity with the defined recording system.

At this time, the control unit 19 makes the signal S152 be output to the DV system decoding unit 132 on the basis of the data indicating the decoding system associated with the video signal recorded on the recording medium 50, which has been analyzed by the stream analyzing unit 152. The control unit 19 makes the DV system decoding unit 132 perform the decoding processing to the signal S152 inputted through the terminals SW5a and SW5c in conformity with the defined decoding system, for example, the DV system, and the DV system decoding unit 132 outputs the decoded signal to the display unit 16 and the external output unit 17 as the signal S132 through the terminals SW3b, SW3c, SW2a and SW2c.

As described above, the present embodiment is provided with the MPEG 1 encoding unit 121 performing the first encoding processing to a video signal, the DV system encoding unit 131 generating the encoded data having a larger data rate than that of the encoded data subjected to the first encoding processing by performing the second encoding processing of the video data, the first recording and reproducing unit 14 recording the video signal subjected to the encoding processing on the recording medium 40 capable of being randomly accessed, the second recording and reproducing unit 15 recording the video signal subjected to the encoding processing on the recording medium 50 capable of being linearly accessed or of being randomly accessed at a lower speed than that of the recording medium 40, and the control unit 19 recording the video signal subjected to the first encoding processing by the MPEG 1 encoding unit 121 on the recording medium 40 through the first recording and reproducing unit 14 in the first mode, recording the video signal subjected to the second encoding processing by the DV system encoding unit 131 on the recording medium 50 through the second recording and reproducing unit 15 in the second mode, and recording the video signal subjected to the second encoding processing by the DV system encoding unit 131 on the recording medium 40 through the first recording and reproducing unit 14 in a case where the residual quantity of the recording medium 50 is smaller than the set value. Consequently, it is possible to record the video signal without performing troublesome operations so as not to degrade the image quality even in a case where the residual quantity of the recording medium 50 is small in the second mode.

That is, because the video signal having the same data rate (high image quality) is recordable on both the recording media 40 and 50, for example, it is possible in the second mode to record a video signal having a high image quality on the recording medium 50, being inexpensive, having a large recording capacity, and being capable of being randomly accessed at a lower speed or being linearly accessed, in comparison with the recording medium 40 and to record the video signal having a high image quality on the recording medium 40, being more expensive, having a less recording capacity, and being capable of being randomly accessed at a higher speed, in comparison with the recording medium 50, in a case where the residual recording quantity of the recording medium 50 is less than the set value. Then, for example, it is possible to record the video signal having the high image quality continuously without any deficiency by replacing the recording medium 50 with a new recording medium 50 while performing recording on the recording medium 40 and then by performing the recording of a video signal on the new recording medium 50.

Moreover, because the recording media 40 and 50 is detachably attachable and exchangeable, for example, the recoding media 40 and 50 can be reproduced by a video processing apparatus such as an external personal computer.

Second Embodiment

Figure 3:
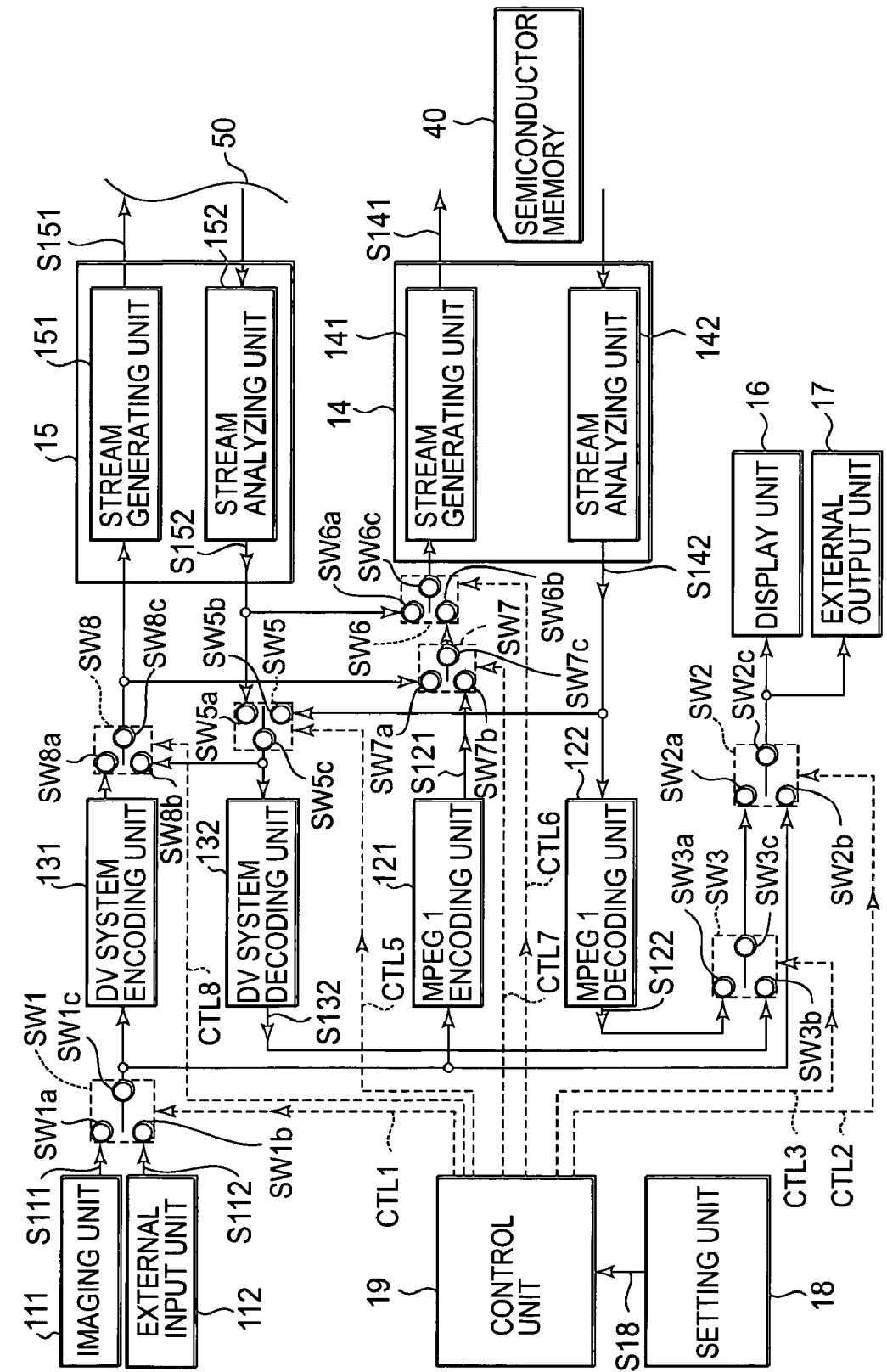
FIG. 3 is a functional block diagram of a video recorder to which a video signal processing apparatus according to a second embodiment of the present invention is applied.

FIG. 3 is a functional block diagram of the video recorder to which the video signal processing apparatus according to a second embodiment of the present invention is applied.

A video recorder 1a according to the present embodiment includes, as shown in FIG. 3, the imaging unit 111, the external input unit 112, the MPEG 1 encoding unit 121, the MPEG 1 decoding unit 122, the DV system encoding unit 131, the DV system decoding unit 132, the first recording and reproducing unit 14, the second recording and reproducing unit 15, the display unit 16, the external output unit 17, the setting unit 18, the control unit 19 and the selectors SW1-SW3 and SW5-SW8.

The video recorder 1a according to the present embodiment reads a video signal recorded on the recording medium 40 which video signal was subjected to encoding processing by the DV system encoding unit 131, and the present embodiment records the read video signal on the recording medium 50. Significant differences from the first embodiment are that the video recorder 1a includes the selectors SW6 and SW7 in place of the selector SW4, and that the selector SW8 is added.

In the following, descriptions are mainly given to the differences from the first embodiment with reference to the attached drawings. Description to the same components as those of the first embodiment and the same operations as those of the first embodiment will be omitted.

For example, as shown in FIG. 3, the selector SW6 has terminals SW6a-SW6c; the selector SW7 has terminals SW7a-SW7c; and the selector SW8 has terminals SW8a-SW8c.

The terminal SW6a is connected to the stream analyzing unit 152 and the terminal SW5a; the terminal SW6c is connected to the stream generating unit 141; and the terminal SW6b is connected to the terminal SW7c. The terminal SW7a is connected to the terminal SW8c and the stream generating unit 151, and the terminal SW7b is connected to the MPEG 1 encoding unit 121. The terminal SW8a is connected to the DV system encoding unit 131, and the terminal SW8b is connected to the DV system decoding unit 132 and the terminal SW5c.

[First Transfer Mode]

The control unit 19 reads the video signal recorded on the recording medium 40 through the first recording and reproducing unit 14 on the basis of a transfer instruction, and records the read video signal on the recording medium 50 through the second recording and reproducing unit 15.

For example, upon receiving the input of the signal S18 instructing the setting of the transfer mode from the setting unit 18, the control unit 19 outputs the control signals CTL5 and CTL8. Thereby, the control unit 19 sets the terminals SW5b and SW5c to the conduction state, and sets the terminals SW8b and SW8c to the conduction state. The control unit 19 makes the first recording and reproducing unit 14 read a signal recorded on the recording medium 40, and the stream analyzing unit 142 analyzes the read stream data in conformity with the defined recording system.

At this time, in a case where the data indicating the decoding system associated with the video signal recorded on the recording medium 40 is the data indicating the second encoding processing (for example, the DV system encoding processing) as a result of the analysis by the stream analyzing unit 142, the control unit 19 inputs the signal S142 outputted from the stream analyzing unit 142 into the stream generating unit 151 through the terminal SW5b, the terminal SW5c, the terminal SW8b and the terminal SW8c. The stream generating unit 151 converts the signal S142 into stream data in conformity with the defined recording system, and records the converted stream data on the recording medium 50 as the signal S151.

On the other hand, in a case where the data indicating the decoding system associated with the video signal recorded on the recording medium 40 is the data indicating the first encoding processing (for example, the MPEG 1 encoding processing) as a result of the analysis by the stream analyzing unit 142, the control unit 19 terminates the transfer processing, or the control unit 19 makes the signal S142 outputted from the stream analyzing unit 142 be input into the stream generating unit 151 through the terminal SW5b, the terminal SW5c, the terminal SW8b and the terminal SW8c. At that time, the stream generating unit 151 converts the signal S142 into stream data in conformity with the defined recording system to record the converted stream data on the recoding medium 50 in association with the data indicating the first encoding processing (the MPEG 1 encoding processing). By performing such processing, in a case where the video signal subjected to the first encoding processing is recorded on the recording medium 40 in the transfer mode, it is possible to terminate the transfer mode, or to record the video signal on the recording medium 50 in association with the data indicating the first encoding processing. Then, it becomes possible to perform the reproducing processing on the basis of the data at the time of reproduction.

As described above, in the video recorder 1a according to the present embodiment, because the video signal recorded on the recording medium 40 is read through the first recording and reproducing unit 14 on the basis of a transfer instruction and the read video signal is recorded on the recording medium 50 through the second recording and reproducing unit 15, for example, it is possible to record (or copy) the video signal, recorded on the recording medium 40, having a high image quality, and subjected to the DV system encoding processing, on the recording medium 50 through the second recording and reproducing unit 15. Moreover, for example, in a case where the residual quantity of the recording medium 50 is equal to the set value or less, it is possible to record the video signal, recorded on the recording medium 40 and subjected to the second encoding processing (DV system encoding processing), on the recording medium 50.

[Second Transfer Mode]

The control unit 19 reads the video signal recorded on the recording medium 50 through the second recording and reproducing unit 15 in accordance with a transfer instruction, and records the read video signal on the recording medium 40 through the first recording and reproducing unit 14.

For example, upon receiving the input of the signal S18 instructing the setting of the second transfer mode from the setting unit 18, the control unit 19 outputs the control signal CTL6, and sets the terminals SW6a and SW6c in the conduction state. The control unit 19 makes the second recording and reproducing unit 15 read the signal recorded on the recording medium 50, and the stream analyzing unit 152 analyzes the read stream data in conformity with the defined recording system.

At this time, when the data indicating the decoding system associated to the video signal recorded on the recording medium 50 is the data indicating the second encoding processing (for example, the DV system encoding processing) as a result of the analysis by the stream analyzing unit 152, the control unit 19 makes the signal S152 outputted from the stream analyzing unit 152 be input into the stream generating unit 141 through the terminals SW6a and SW6c. The stream generating unit 141 converts the signal S152 into the stream data in conformity with the defined recording system, and records the converted stream data on the recording medium 40 as a signal S141.

As described above, in the video recorder 1a according to the present embodiment, because the video signal recorded on the recording medium 50 is read through the second recording and reproducing unit 15 by a transfer instruction and the read video signal is recorded on the recording medium 40 through the first recording and reproducing unit 14, for example, it is possible to record (copy) the video signal, recorded on the recoding medium 50, having a high image quality, and subjected to the DV system encoding processing, on the recording medium 40 through the first recording and reproducing unit 14.

Third Embodiment

FIG. 4 is a functional block diagram of the video recorder to which a video signal processing apparatus according to a third embodiment of the present invention is applied.

A video recorder 1b according to the present embodiment, for example, as shown in FIG. 4, includes the imaging unit 111, the external input unit 112, the MPEG 1 encoding unit 121, the MPEG 1 decoding unit 122, the DV system encoding unit 131, the DV system decoding unit 132, the first recording and reproducing unit 14, the second recording and reproducing unit 15, the display unit 16, the external output unit 17, the setting unit 18, the control unit 19 and the selectors SW1-SW5 and SW9.

The video recorder 1b according to the present embodiment reads a video signal, recorded on the recording medium 40 and subjected to the encoding processing by the DV system encoding unit 131, and performs the decoding processing of the read video signal to restore the video signal to a base band signal. Then, the video recorder 1b performs the editing processing of the base band signal, and performs the second encoding processing (DV system encoding processing) thereof. Thus, the video recorder 1b records the encoded video signal on the recording medium 50 through the second recording and reproducing unit 15.

A significant difference of the present embodiment from the first and the second embodiments is that the video recorder 1b is provided with a selector SW9 and an editing unit 20. Description to the same components and the same operations as those of the first and the second embodiments will be omitted.

For example, as shown in FIG. 4, the selector SW9 includes terminals SW9a-SW9c. The terminal SW9a is connected to the terminals SW1c and SW2b; the terminal SW9b is connected to the editing unit 20; and the terminal SW9c is connected to the DV system encoding unit 131.

The editing unit 20 performs the editing processing, for example, the editing processing such as special image effect processing, cut processing and copy processing, of the video signal as an inputted base band signal by the control of the control unit 19, and outputs the processed signal.

[Base Band Conversion Mode]

For example, when the control unit 19 receives the input of the signal S18 instructing the setting of a base band conversion mode from the setting unit 18, the control unit 19 outputs the control signals CTL5 and CTL9. Thereby, the control unit 19 sets the terminals SW5b and SW5c in the conduction state, and sets the terminals SW9b and SW9c in the conduction state.

The control unit 19 makes the first recording and reproducing unit 14 read a signal recorded on the recording medium 40, and the stream analyzing unit 142 analyzes the read stream data in conformity with the defined recording system.

At this time, in a case where the data indicating the decoding system associated with the video signal recorded on the recording medium 40 is the data indicating the second encoding processing (for example, the DV system encoding processing) as an analysis result of the stream analyzing unit 142, the control unit 19 makes the signal S142 outputted from the stream analyzing unit 142 be input into the DV system decoding unit 132 through the terminal SW5b and the terminal SW5c. The DV system decoding unit 132 performs the defined decoding processing of the signal S142, and outputs the signal S132 as a base band signal.

In a case of performing the editing processing, the editing unit 20 performs the editing processing. In detail, the editing unit 20 performs the editing processing mentioned above on the basis of the signal S132, and outputs the edited signal as the signal S20. The signal S20 is inputted into the DV system encoding unit 131 through the terminals SW9b and SW9c. The DV system encoding unit 131 performs the second encoding processing (DV system encoding processing) to the signal, and outputs the processed signal to the second recording and reproducing unit 15 as the signal S131. Then, the second recording and reproducing unit 15 records the inputted signal on the recording medium 50 in conformity with the defined recording system.

On the other hand, in a case of outputting a base band signal, the control unit 19 outputs the control signals CTL3 and CTL2, and sets terminals SW3b, SW3c, SW2a and SW2c in the conduction state.

The signal S132 outputted from the DV system decoding unit 132 is outputted to the display unit 16 and the external output unit 17 through the terminals SW3b, SW3c, SW2a and SW2c.

As described above, in the present embodiment, the video signal recorded on the recording medium 40 is once restored to the base band signal, and the editing processing thereof is performed as the need arises. After that, the video signal receives the second encoding processing, and can be recorded on the recording medium 50 by the second recording and reproducing unit 15.

It is noted that the present invention is not restricted to the present embodiment, and arbitrary suitable alterations can be performed. For example, although the video signal subjected to encoding processing of the DV system is recorded on the magnetic tape and the video signal subjected to the encoding processing of the MPEG 1 system is recorded in the semiconductor memory, the present invention is not restricted to this form. For example, the video signal subjected to the encoding processing in conformity with arbitrary suitable encoding systems, such as the MPEG 1, the MPEG 2, the MPEG 4 and the MPEG 8 systems, may be recorded on a recording medium. Moreover, the video signal may be a signal of not only a standard (SD) image, but also a high-definition (HD) image or other kinds. Moreover, the recording medium such as the magnetic tape and the semiconductor memory may be a HDD, an optical disc, a magneto-optical disc and other detachable recording media.

Moreover, if the storage capacity of a semiconductor memory that can be removed and be rewritable is increased and the cost thereof becomes lower, as the recording medium, the present invention becomes more profitable.

Moreover, although the processing of a video signal has been described in the embodiments described above, the signal is not restricted to the video signal. The first and the second encoding processing may be performed also to a sound signal, and the processed sound signal may be recorded in the first and the second recording media. Moreover, although mainly the embodiments which perform the processing according to the present invention on the basis of the signal S111 outputted from the imaging unit 111 have been described, the present invention is not restricted to this form. For example, the processing according to the present invention may be performed on the basis of the signal S112 from the external input unit 112.

The present invention is applicable to the video signal processing apparatus and the method which performs the processing of recording the video signal inputted from, for example, the imaging unit, the external apparatus and the like on the recording medium.

The present document contains subject matter related to Japanese Patent Application JP 2004-238349 filed in the Japanese Patent Office on Aug. 18, 2004, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing apparatus, comprising:
    first image processing means for performing first image processing to a video signal;
    second image processing means for performing second image processing to the video signal, and for generating a signal of a data rate larger than that of the video signal subjected to the first image processing;
    first recording means for recording the video signal subjected to the image processing on a first recording medium capable of being randomly accessed;
    second recording means for recording the video signal subjected to the image processing on a second recording medium capable of being linearly accessed or of being randomly accessed at a speed lower than that of the first recording medium; and
    control means for recording the video signal subjected to the first image processing by said first image processing means on the first recording medium through said first recording means in a first mode, recording the video signal subjected to the second image processing by said second image processing means on the second recording medium through said second recording means in a second mode, and recording the video signal subjected to the second image processing by said second image processing means on the first recording medium through said first recording means in a case where a residual quantity of the second recording medium is smaller than a set value.

2. The video signal processing apparatus according to claim 1, wherein:
    said first image processing means includes first encoding means for performing first-encoding processing to the video signal,
    said second image processing means includes second encoding means for performing second encoding processing to the video signal to generate encoded data of a data rate larger than encoded data generated by the first encoding processing, and
    said control means records the video signal subjected to the first encoding processing by said first encoding means on the first recording medium through said first recording means in the first mode, records the video signal subjected to the second encoding processing by said second encoding means on the second recording medium through said second recording means in the second mode, and records the video signal subjected to the second encoding processing by said second encoding means on the first recording medium through said first recording means in a case where the residual quantity of the second recording medium is smaller than the set value.

3. The video signal processing apparatus according to claim 2, wherein:
    said control means reads the video signal recorded on the first recording medium through said first recording means in response to a transfer instruction, and records the read video signal on the second recording medium through said second recording means.

4. The video signal processing means according to claim 2, further comprising decoding means for performing decoding processing corresponding to the second encoding processing, wherein:
    said control means reads from the first recording medium the video signal subjected to the second encoding processing through said first recording means, performs the decoding processing of the read video signal by said decoding means, and then performs the second encoding processing to the decoded video signal by said second encoding means to record the encoded video signal on the second recording medium through said second recording means.

5. The video signal processing apparatus according to claim 4, further comprising editing means, wherein:

said control means reads from the first recording medium the video signal subjected to the second encoding processing through said first recording means, performs the decoding processing by said decoding means to the read video signal, further performs editing processing by said editing means to the decoded video signal after the decoding processing, and then performs the second encoding processing by said second encoding means to the edited video signal to record the encoded video signal on the second recording medium through said second recording means.

6. The video signal processing apparatus according to claim 1, further comprising imaging means for generating the video signal on the basis of imaging, wherein:

said first and said second image processing means perform image processing to the video signal generated by said imaging means.

7. The video signal processing apparatus according to claim 1, wherein:

the first and the second recording media are recording media detachably attachable and exchangeable.

8. The video signal processing apparatus according to claim 7, wherein:

the first recording medium is a semiconductor memory.

9. A video signal processing method using a video signal processing apparatus including:

first image processing means for performing first image processing to a video signal;

second image processing means for performing second image processing to the video signal, and for generating a signal of a data rate larger than that of the video signal subjected to the first image processing;

first recording means for recording the video signal subjected to the image processing on a first recording medium capable of being randomly accessed; and second recording means for recording the video signal subjected to the image processing on a second recording medium capable of being linearly accessed or of being randomly accessed at a speed lower than that of the first recording medium, said method comprising a control step of:

recording the video signal subjected to the first image processing by said first image processing means on the first recording medium through said first recording means in a first mode;

recording the video signal subjected to the second image processing by said second image processing means on the second recording medium through said second image processing means in a second mode; and recording the video signal subjected to the second image processing by said second image processing means on the first recording medium through said first recording means in a case where a residual quantity of the second recording medium is smaller than a set value.

10. A video signal processing apparatus, comprising:

a first image processor for performing first image processing to a video signal;

a second image processor for performing second image processing to the video signal, and for generating a signal of a data rate larger than that of the video signal subjected to the first image processing;

a first recorder for recording the video signal subjected to the image processing on a first recording medium capable of being randomly accessed;

a second recorder for recording the video signal subjected to the image processing on a second recording medium capable of being linearly accessed or of being randomly accessed at a speed lower than that of the first recording medium; and a controller for recording the video signal subjected to the first image processing by said first image processor on the first recording medium through said first recorder in a first mode, recording the video signal subjected to the second image processing by said second image processor on the second recording medium through said second recorder in a second mode, and recording the video signal subjected to the second image processing by said second image processor on the first recording medium through said first recorder in a case where a residual quantity of the second recording medium is smaller than a set value.

* * * * *